No. 760,845.

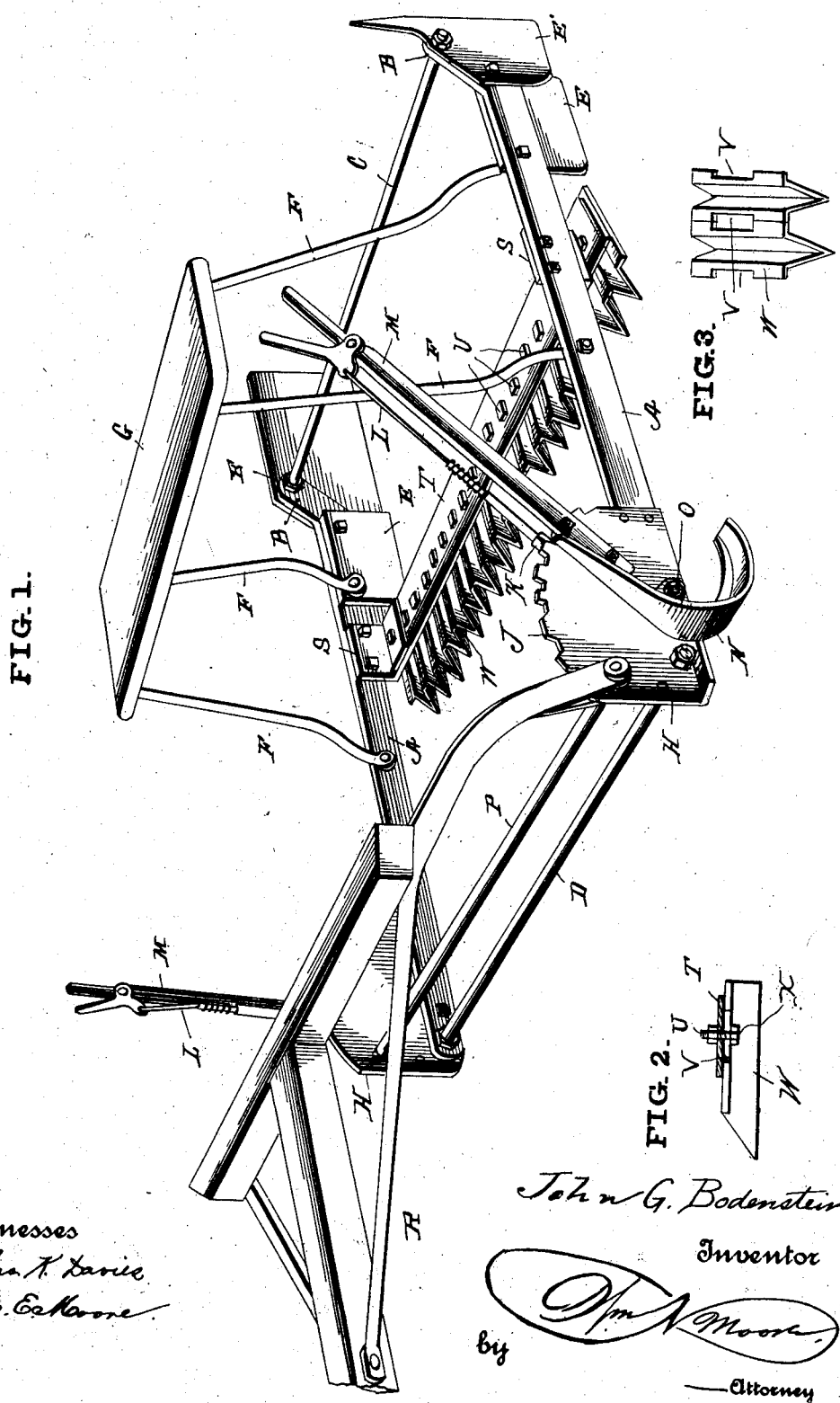

Patented May 24, 1904.

UNITED STATES PATENT OFFICE.

JOHN G. BODENSTEIN, OF STAATSBURG, NEW YORK.

FIELD ICE-PLANER.

SPECIFICATION forming part of Letters Patent No. 760,845, dated May 24, 1904.

Application filed September 24, 1903. Serial No. 174,446. (No model.)

*To all whom it may concern:*

Be it known that I, JOHN G. BODENSTEIN, a citizen of the United States, residing at Staatsburg, in the county of Dutchess and State of New York, have invented certain new and useful Improvements in Field Ice-Planers, of which the following is a specification.

My invention relates to improvements in field ice-planers; and one object of my invention is the provision of a field ice-planer which will not be affected when used upon rough or uneven ice, but which will plane the surface of any character of ice in a thorough and perfect manner.

Another object of my invention is the provision of a field ice-planer which can be quickly adjusted to accommodate the knives or cutters to the surface of the ice to perfectly regulate the depth of cut required.

Another object of my invention is the provision of a field ice-planer which will be effective on rough or smooth ice, which can be adjusted to the character of work, and which will be the embodiment of simplicity, durability, and inexpensiveness, thus combining the requisites to render the machine entirely practicable.

With these objects in view my invention consists of a field ice-planer embodying novel features of construction and combinations of parts, substantially as disclosed herein.

Figure 1 represents a perspective view of a field ice-planer constructed in accordance with and embodying my invention. Figs. 2 and 3 represent detail views of the knives or cutters and the manner of mounting them.

In the drawings the letter A designates the side rails of the frame of my ice-planer formed at the rear with the upturned end B, said ends being connected by the cross-bar C and the forward end being connected by cross-bar D. To the side rails near their upturned ends are secured the pair of runners E, and to the upturned ends in rear of said runners are secured the guide or marking plates E'. To said side rails are fastened the standards F, which support the driver's seat G. At the forward end of the side rails is secured the pair of plates H, having their upper portions provided with segmental racks J, with which engage the spring-detents K, connected with the spring-levers L, said levers being mounted upon the levers M, which at their lower ends are secured to the curved shoes N, which are pivoted at O to said plates H. From this construction it will be observed that the shoes can be quickly and easily adjusted by the driver to suit the requirements of the planer, and the plates are connected by a cross-bar P, which extends through said plates and is secured to the draft attachment R.

Secured to the side rails of the frame at the proper point are the vertical plates S, formed on the knife-supporting bar T, said bar extending across the frame and being provided with openings to receive the securing-bolts U, which pass through kerfs or recesses V, formed in the cutters W, and the heads X of the bolts when the cutters are in position serve to rigidly secure the series of cutters to the knife-supporting bar. It will be observed that the knives are of conical shape and have the wings or flanges formed with the kerfs or recesses which when the knives are put together form the series of openings V and that the heads X of the bolts or fastenings securely hold the series of knives in position.

From the foregoing description, taken in connection with the drawings, the operation of my ice-planer will be readily understood, and it will be observed that the planer is drawn over the surface of the ice and the shoes form the runners, being properly adjusted to suit the character of ice and to regulate the depth at which the knives or cutters shall plane the surface of the ice, and the rear runners are arranged in the proper relation to the cutters to enter the groove made by each of the outer cutters, and thus cause the machine to move smoothly over the surface of the ice without subjecting the knives to hard usage and causing the machine to plane the surface of the ice, whether rough or smooth, in a perfect manner.

The advantages of my ice-planer will be readily understood by all skilled in the art, and its simplicity and durability of construction, its inexpensiveness and efficiency, and its ease of operation will commend it as desirable and practical. It will also be noted that my planer dispenses with the usual runners which engage the surface of the ice and that the shoes will run smoothly on rough or even ice and relieve the cutters from hard contact or shock and the runners traveling in the cut made by the knives will insure a smooth running of the machine under all conditions.

I claim—

1. In a field ice-planer, the combination of the side rails, the markers secured to the rear of said rails, the knife-bar mounted between the rails and carrying the knives or cutters, the plates secured at the forward ends of said rails and formed with the curved racks, the shoe pivoted to said plates, the handle secured to the upper end of the shoe, the spring-dog mounted upon the handle and adapted to engage the teeth of the rack to adjust the shoe, and the draft mechanism connected to said plates.

2. In a field ice-planer, the combination of the side rails, the upturned portions at the rear of said rails, the marking-plates connected to said upturned end, the seat mounted on the side rails, the knife-bar mounted between the side rails and carrying a series of knives, the plates having the rack connected to the forward end of the rails, the curved shoes pivoted to said plates and adapted to form runners, the handles for adjusting said runners, and the spring dogs or detents for engaging the rack and holding the runners at the proper adjustment.

In testimony whereof I affix my signature in presence of two witnesses.

JOHN G. BODENSTEIN.

Witnesses:
FRED BODENSTEIN,
WILLARD T. VAIL.